Sept. 14, 1948.  A. J. ABRAMS ET AL  2,449,359
MANUFACTURE OF CARBON MONOXIDE
AND HYDROGEN FROM METHANE
Filed Jan. 25, 1945
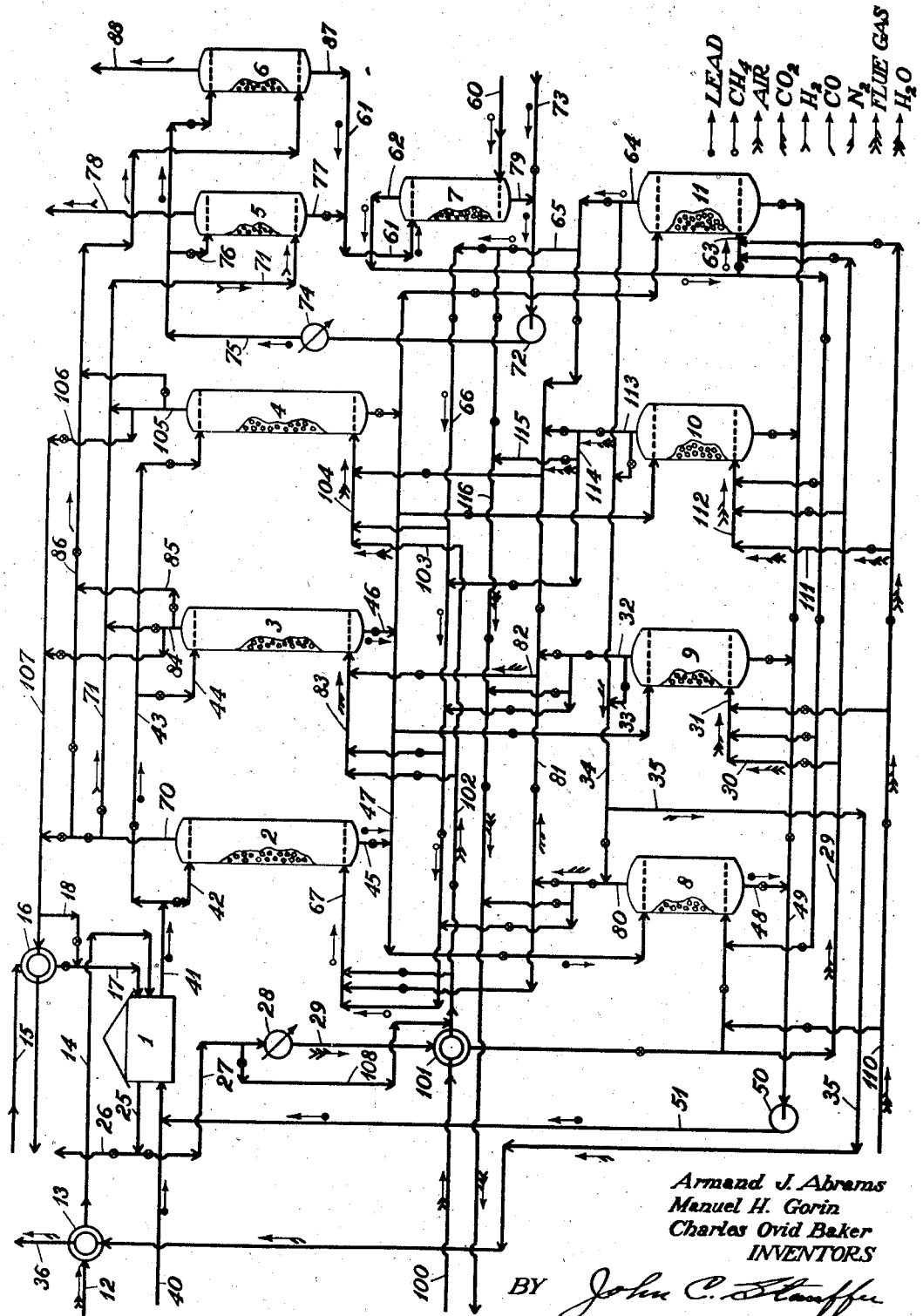
Armand J. Abrams
Manuel H. Gorin
Charles Ovid Baker
INVENTORS
BY John C. Stauffer
ATTORNEY Patented Sept. 14, 1948

2,449,359

UNITED STATES PATENT OFFICE 2,449,359

MANUFACTURE OF CARBON MONOXIDE AND HYDROGEN FROM METHANE

Armand J. Abrams, Manuel H. Gorin, and Charles Ovid Baker, Dallas, Tex., assignors, by mesne assignments, to Socony-Vacuum Oil Company, Incorporated, New York, N. Y., a corporation of New York Application January 25, 1945, Serial No. 574,612

15 Claims. (Cl. 48—196)

This invention relates to a method for making carbon monoxide and hydrogen from methane and natural gas for use as a synthesis gas. More particularly this invention has to do with a unified process for the production of synthesis gas wherein the heat supply necessary for the highly endothermic reactions involved is furnished to the reaction zones as sensible heat of a molten metal.

Numerous processes have been proposed for the production of carbon monoxide and hydrogen in suitable proportions for the synthesis of hydrocarbons. These processes generally involve the interaction of hydrocarbons such as methane with steam and/or carbon dioxide or air to give mixtures of hydrogen and carbon monoxide in volume ratios of 1 to 1 up to 3 to 1, hydrogen to carbon monoxide. The chief technical difficulty confronting operation to produce these reactants in quantity is the supplying of large amounts of heat to the reacting gases at a high temperature level and recovering the desired product free from gaseous contaminants, particularly where air is used as a reactant. The solution of this problem has been attempted in some instances by employing externally fired reaction chambers in conjunction with regeneration heat-exchangers of special design. However, the problem of designing metallic reaction tubes which will withstand temperatures of 1800° F. or higher and the necessity of using prohibitive lengths of such tubes to obtain capacities consistent with present day requirements of large quantity production make such a method of heat transfer impractical. Other methods of operating on the thermal conversion cycle involve the passing of the mixture of reactants through a conduit filled with permeable refractory material previously heated to about 2000° F. by an air-gas blast. An objection to this type of operation is the difficulty of maintaining close temperature control of optimum temperature levels in the reaction zone.

The object of the present invention is to prepare hydrogen and carbon monoxide of relatively high purity suitable for use as a hydrocarbon synthesis gas. Another object of the invention is to prepare hydrogen and carbon monoxide by reacting methane or natural gas to produce approximately two volumes of hydrogen gas for each volume of carbon monoxide in the product stream. Still another object of the invention is to process methane to form hydrogen and carbon monoxide in an apparatus which is capable of close temperature control and high rates of heat transfer to and from the reactants. These and further objects of the invention will be apparent from the following description taken together with the accompanying drawing which is a diagrammatic representation of the flow of heat transfer media, reactants, and products when operating our process in a three stage conversion system.

In the presence of contact agents such as lime and other porous refractory solids, methane reacts with carbon dioxide to give free hydrogen and carbon monoxide, carbon being deposited in the refractory. This reaction is represented by the equation

$$2CH_4 + CO_2 \rightarrow C + 2CO + 4H_2$$

The deposited carbon may then be reacted with oxygen to form carbon dioxide for recycle to the methane conversion step. In this reaction methane may be "cracked" in a first stage to form hydrogen according to the following equation

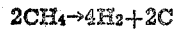
$$2CH_4 \rightarrow 4H_2 + 2C$$

One-half of the carbon deposited may be reacted with carbon dioxide to give two parts of carbon monoxide according to the equation

$$C + CO_2 \rightarrow 2CO$$

thus producing carbon monoxide in one-half the amount of volume of hydrogen produced in the "cracking" step. In a third stage the remaining carbon may be removed by burning to carbon monoxide which can be recycled to the furnace to be burned to carbon dioxide to furnish an appreciable amount of the heat necessary for heating the circulating metallic heat transfer medium and for furnishing the carbon dioxide for the preceding conversion step. Since the necessary carbon dioxide is furnished by burning the remaining carbon with a free oxygen containing gas, preferably air, the overall reaction is

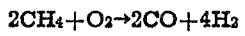
$$2CH_4 + O_2 \rightarrow 2CO + 4H_2$$

Our process involves operating with molten metal such as lead, tin or other metal having nonwetting properties with respect to the refractory packing in the contact towers as heat transfer media to supply heat to the countercurrent flowing reactant gases of a two stage or three stage process. The accompanying drawing and description thereof which illustrates one way in which our invention may be employed should not be interpreted to limit the invention to the specific procedure, apparatus and conditions employed therein.

Referring now to the drawing, furnace 1 is designed for heating of a relatively shallow, continuously flowing body of molten metal, such as melted lead, by impinging directly thereon the flame and combustion products of carbon monoxide and methane with air, the flow of melted lead being counter to flame propagation and counter to the flow of combustion products. Relatively cold melted lead is introduced to the furnace near the exit points for the flue gases which give up heat to the stream of lead. The lead reaches its maximum temperature, i. e., within the range of from about 1800° F. to 2400° F., say about 2150° F., near the point of flame impingement and is withdrawn from the bottom of the molten stream. In order to prevent oxidation of the metal, we superimpose on the molten metal a relatively thin layer of a low vapor pressure material, such as calcium metaphosphate, which is liquid at furnace operating temperatures. This method of protecting oxidizable metals at high temperatures is taught and claimed in the copending application of Armand J. Abrams, Serial No. 574,611, filed January 25, 1945. This material has a melting point of about 1790° F. and when floated on the slowly moving stream of metal in furnace 1, it offers only slight resistance to transfer of heat to the metal if used in a film of from about one-eighth to two inches in thickness. The molten lead is withdrawn from the bottom of the slowly moving stream and hence the protective layer remains practically stationary, preventing oxidation and minimizing vaporization of the molten metal.

Towers 2, 3, and 4, which are packed with refractory material such as lump lime, crushed brick or other porous refractory material, are contact zones alternately used for contacting hot metal under nonflooding conditions with methane to produce hydrogen and free carbon which deposits in the packing material and then to contact the packing material with hot metal and carbon dioxide to form carbon monoxide in the second stage of the process. Lump lime is preferred as the packing material since methane can be cracked over it with the carbon produced being substantially completely retained by the lime in amounts up to about 3 mols per mol of lime as indicated in Armand J. Abrams and L. B. Cook's copending application, Serial No. 419,238, now Pat. No. 2,380,008, filed November 15, 1941. Furthermore, the carbon produced in this way is in an active form which allows the carbon-carbon dioxide reaction to proceed readily. Only a part of the carbon is removed in this second stage and hence the remaining carbon associated with the packing in the third stage is subjected to oxidation to carbon monoxide while the other two towers are on stream for the production of hydrogen and carbon monoxide as mentioned above.

Towers 5 and 6, also packed with ceramic ware or other refractory material, are lead recovery towers. The hot hydrogen and carbon monoxide leaving the lead contact towers carry an appreciable amount of metal vapor, especially if lead is used as the metal heat transfer agent. These metal vapors are recovered in large part by scrubbing the vapor effluent from the metal contact reaction towers with the relatively cool liquid metal the metal flowing to tower 7 for cooling by preheating the methane or natural gas prior to introduction of said methane to the reaction tower.

Towers 8, 9, 10, and 11, are polyfunctional in that they serve to cool hot metal flowing by gravity from reaction towers 2, 3, and 4, to a temperature suitable for pumping back to furnace 1, to furnish a second stage preheat for the methane passing to the reaction tower and also as adsorption and desorption zones for carbon dioxide extracted from flue gas. These towers are packed with a suitable alkaline earth carbonate or mixture of alkaline earth carbonates such as limestone or dolomite. Limestone, that is, calcium carbonate, upon heating at temperatures above about 1500° F., decomposes to furnish carbon dioxide at approximately one atmosphere leaving the solid refractory calcium oxide, which, at temperatures below about 1400° F., is an excellent absorbent for carbon dioxide from flue gas increasing in absorption efficiency as the temperature is lowered. Molten metal leaving reaction towers 2, 3, or 4, at temperatures of 1800° F. or higher should be cooled to a temperature as low as 1400° or 1500° F. in order to be economically pumpable for recycle to furnace 1. This cooling is accomplished by passing the molten metal through one of the carbonate packed towers 8, 9, 10, or 11, and simultaneously desorbing carbon dioxide for the second or carbon monoxide producing stage of our process. These towers are operated alternately in a cyclic manner for the absorbtion and desorption of carbon dioxide and as heat exchangers. The desorbed carbonate is further cooled by the second stage preheating of methane reactant feed as described above and, if desired, further cooling of the packed tower to most efficient carbon dioxide absorbing temperatures may be accomplished by blowing the bed with relatively cold but dry steam. The hot steam product can be used in our process and/or the collateral refining of the synthetic product therefrom. However, the temperature of these carbon dioxide towers should not be lowered by the use of steam to a temperature below about 1100° F. since below this temperature in the presence of steam, the calcium oxide will become hydrated.

Methane or natural gas in line 12 is passed via heat exchanger 13 and line 14 to furnace 1. Preheated air is introduced to the burners of furnace 1 through line 15, heat exchanger 16 and line 17. To the air in line 17 may be added at least a part of the carbon monoxide containing product gas in line 18, supplied by regeneration tower 4 through lines 105, 106, and 107. Hot flue gases pass from the furnace via line 25 to line 26. At least a part of the hot flue gas may be sent to a regenerative heat exchange system (not shown) for cooling and to furnish preheat for gases passing to furnace 1 or for preheating any other stream before passing from the process. However, we prefer to direct the major part of the flue gas from line 25 to line 27 and thence via heat exchange system 28 and lines 29, 30 and 31 to the carbon dioxide absorption lime packing in tower 9, previously cooled as described herein above. If desired, a gas filter or other form of guard chamber may be inserted in line 27 or line 29 for the protection of the carbon dioxide absorbent in towers 8, 9, 10, and 11 against contamination with suspended solids in the flue gas effluent from furnace 1. The carbon dioxide in the flue gas is absorbed in tower 9 and the residue gas flows via lines 32, 33, and 34, to line 35 and thence to heat exchanger 13 for cooling prior to elimination from the process via line 36.

In the molten metal heat transfer cycle of our process melted lead is passed via line 40 to furnace 1 where it is heated to a temperature of about 2150° F. The hot metal passes by gravity via line 41 to lines 42, 43, and 44, which lead to the top of the refractory packing in towers 2 and 3, respectively. As the heated liquid passes downward over the surface of the packing in these towers it gives up a part of its sensible heat to the packing and to the countercurrent stream of methane in tower 2 and carbon dioxide in tower 3, the methane being "cracked" to hydrogen and carbon which is deposited in the packing while the carbon dioxide in tower 3 is converted to carbon monoxide by interaction with carbon in the packing in this tower. The liquid metal flows from towers 2 and 3 at a temperature within the range of from about 1800° F. to about 2050° F. through lines 45 and 46 to manifold line 47 and thence to lime carbonate tower 8 which has been previously cooled before absorbing the carbon dioxide from the flue gas. As the metal flows over the packing in tower 8 it gives up more of its sensible heat to the tower packing and to the endothermic desorption of the carbonate until the temperature of the metal in exit line 48 is below about 1600° F., preferably below 1500° F., and the liquid metal passes via line 48 to manifold line 49 whence it is picked up by the pump 50 for recycle to furnace 1 via lines 51 and 40.

In the hydrogen producing cycle of our process, methane previously purified with respect to hydrogen sulfide content, is introduced to the lower part of tower 7 through line 60 for picking up heat in a first stage preheat from hot metal introduced to tower 7 from towers 5 and 6 through manifold line 61. The methane is heated to a temperature within the range of from 1000° F. to about 1400° F. in tower 7 and passes thence via lines 62 and 63 to carbon dioxide recovery tower 11 where it picks up heat in the second stage preheating step by absorbing sensible heat from the hot desorbed carbonate packing. From tower 11 the methane passes overhead through lines 64 and 65, manifold line 66 and line 67 to tower 2 where it is "cracked" to hydrogen and carbon as described above. The overhead gaseous product from tower 2 consisting of more than 90 percent hydrogen and about 9 percent methane with a small amount of lead vapors passes from tower 2 at a temperature of about 2000° F. through lines 70 and 71 to tower 5 for the recovery of lead vapors. Liquid lead is introduced to this recovery system by means of pump 72 in line 73 and is delivered to the top of tower 5 via cooler 74 and lines 75 and 76. The temperature of the liquid lead at the top of tower 5 will be above about 650° F. and above about 1800° F. as it leaves tower 5 via line 77 which connects with manifold line 61. As the relatively cold liquid lead flows over the packing in tower 5, it contacts the hydrogen product and scrubs therefrom the major part of the lead vapor and the product, cooled to a temperature of from 700° F. to 750° F., passes from tower 5 via overhead line 78. If desired, the gaseous product may be further cooled to solidify the residual lead which may be recovered by passing the cold gas to a cyclone separator or other separation means well known to the art for recovering the last traces of lead. As described hereinabove, the hot liquid lead in line 61 furnishes preheat to methane feed in tower 7 as it is cooled to a temperature below about 1000° F. whence it is passed via line 79 to line 73 for further cooling in cooler 74 and recycle to tower 5.

Returning now to the carbon dioxide desorption step in tower 8, as the hot metal from line 47 contacts the carbonate in tower 8 carbon dioxide passes overhead through line 80 to manifold line 81 and thence by lines 82 and 83 to tower 3 where it contacts the carbon deposited in the methane cracking stage. Heat for this endothermic reaction to produce carbon monoxide is provided by the molten lead at a temperature within the range of from 1800° to 2400° F., that is, at about 2150° F., the lead flowing downward over the hot, carbon impregnated packing. Only a part, that is, about one-half the carbon, is removed as carbon monoxide in tower 3 and the gaseous overhead product at a temperature of about 2000° F. passes overhead via lines 84 and 85 to manifold line 86 which leads to the bottom of tower 6. This gaseous product also contains lead vapors which are recovered in tower 6 by scrubbing the gas with relatively cold liquid lead introduced to tower 6 through line 75 and withdrawn for cooling and recycle through line 87. The carbon monoxide product passes from tower 6 through line 88 at a temperature of about 750° F. to a cooling system and further separation of any residual lead. This cooling and separation may be made in the same system as provided for the final purification of the hydrogen. The final carbon monoxide stream, purified with respect to lead vapors, will contain less than two percent carbon dioxide and the daily volume production is approximately one-half the gas production on the hydrogen cycle thus providing for a final mixture of hydrogen and carbon monoxide in the ratio of 2 to 1, assuming that only one-half the carbon deposited in the packing in the hydrogen production cycle is removed in the carbon monoxide cycle. This ratio may be changed by varying the length of the cycle in either the hydrogen or carbon monoxide production side of the process.

The extent of conversion in towers 2 and 3 will be determined by space velocities in these towers as well as by the temperatures. Space velocities within the range of from about 0.2 to 3.0, preferably from about 0.5 to 1.5, volumes of methane or natural gas per volume of packed reaction space per minute, may be used in the hydrogen production cycle and space velocities of carbon dioxide within this same range may be used in the carbon monoxide production cycle. Space velocities in this cycle are from 0.3 to 3.0 volumes of carbon dioxide gas per volume of catalyst space per minute. The preferred range is from about 0.4 to about 1.0. The space velocities should be adjusted to obtain relatively pure streams of hydrogen and carbon monoxide at the particular operating temperatures chosen. The operation of these cycles is at atmospheric or slightly higher pressures up to fifteen pounds gauge pressure. The above space velocities are expressed as volumes of gas measured at standard conditions of temperature and pressure.

While towers 2 and 3 are on stream producing hydrogen and carbon monoxide, tower 4, which has been taken off stream from the carbon monoxide cycle, is subjected to regeneration by removal of the remaining deposited carbon. This is accomplished by burning the carbon to form carbon monoxide. The flow of molten lead to tower 4 is discontinued during this carbon burning cycle. Air is introduced through line 100 and passes through heat exchange system 101 where it is heated in withdrawing heat from flue gas in line 29. It is then passed via manifold line 102 and lines 103 and 104 to tower 4 near the bottom of which the carbon is first burned in carbon dioxide. As the carbon dioxide passes upward in contact with additional carbon deposit, the carbon dioxide is reconverted to carbon monoxide which passes from the tower via overhead line 105 and line 106 to manifold line 107. As stated hereinabove, at least a part of this gas in line 107 may be used in the fuel gas for heating in furnace 1. If desired, the regeneration air in line 102 may be diluted with respect to oxygen by introducing hot flue gas from line 108 which leads from flue gas line 27. The carbon dioxide content of such dilution flue gas is converted to carbon monoxide in tower 4 during the regeneration cycle. At the end of the regeneration cycle the refractory bed is relatively free of carbon deposit and being at a relatively high temperature is in condition for the hydrogen production cycle.

Returning now to the carbon dioxide absorption step, the lime in tower 10 following the initial precooling in the second stage methane preheating as described above in connection with tower 11, may be further reduced in temperature by introducing relatively cool but dry steam to the bed through manifold line 110 and lines 111 and 112. As stated above, the temperature of the packing should not be below about 1100° F. Temperatures within the range of from about 1100° F. to about 1400° F. are suitable for the absorption of carbon dioxide by the lime packing in tower 10. The hot steam passes from tower 10 through lines 113, 114, and 115, to manifold line 116 and thence to heat exchange equipment for use in any heating step of our process or allied synthetic hydrocarbon refining process.

Although we have described our invention as a three stage process wherein hydrogen and carbon monoxide are produced in separate reaction zones, we do not wish to be limited to the separate production of hydrogen and carbon monoxide. As stated hereinabove, methane and carbon dioxide may be reacted simultaneously in the same reaction zone to form hydrogen, carbon monoxide and free carbon, thus combining the first and second stages of the process. In fact, it may be of advantage by way of economy in the number of towers required to so combine stages 1 and 2, thus providing greater flexibility with respect to the operation of stage 3, that is, the conversion of the residual carbon to carbon monoxide which operation requires a longer cycle time than either stage 1 or stage 2 in order to completely convert said residual carbon to carbon monoxide for use in the metal preheating step. On the other hand, the three stage process provides greater flexibility with respect to converting methane to hydrogen and carbon to carbon monoxide in suitable proportions if these products are produced in separate streams for blending in a 2 to 1 ratio of hydrogen to carbon monoxide. Hence, we may operate our process interchangeably as a two stage or three stage process in order to obtain the advantages peculiar to each type of operation.

As another alternative, we can operate in such a way that all of the carbon produced by the cracking of methane in a first stage is removed in a second stage by reaction with carbon dioxide to produce carbon monoxide. In both stages a packed reactor is employed and molten lead furnishes the heat of the endothermic reactions. By mixing the hydrogen from the first stage with the carbon monoxide from the second stage, synthesis gas, having a ratio of 1 to 1, is obtained. This may be brought to a ratio of 2 to 1 by introducing hydrogen from an outside source. Another method of enriching the product with hydrogen is to react a part of the carbon monoxide from the second stage with steam by means well known to the art (nickel catalyst, for instance, 750–1100° F.) to produce hydrogen and carbon dioxide. The carbon dioxide is then scrubbed out of this gas and the hydrogen thus produced is combined with the remaining carbon monoxide and the hydrogen from the first stage. To produce a synthesis gas having 2 parts of hydrogen and 1 part of carbon monoxide, ⅓ of the carbon monoxide produced in the second stage is reacted with steam. The $CO_2$ required for this operation may be obtained in part or entirely from the flue gas leaving the furnace which heats the lead. In case the steam-carbon monoxide conversion is used, part of the carbon dioxide required may be furnished from this source.

Still another alternative is to combine the two stages in the scheme above by passing a mixture of methane and carbon dioxide in a 1 to 1 ratio through a packed reactor using lead to furnish the endothermic heat of reaction. When operating in this way there is no net production of carbon and the product gas contains carbon monoxide and hydrogen in a 1 to 1 ratio. This gas may be enriched by bringing in hydrogen from another source or by reacting it with steam as above and scrubbing out the carbon dioxide produced.

As indicated hereinabove, our process offers certain advantages over previous methods of producing hydrogen and carbon monoxide for use as synthesis gas. One of the chief advantages of our process is the efficient method of direct heat transfer to the reacting gases whereby large volumes of these gases can be converted at high temperatures which can be controlled within narrow ranges. Another advantage is the conservation of hydrocarbon material. A relatively large proportion of the hydrogen, carbon and fuel value of natural gas is used in our process, there being very little loss over and above the loss occasioned by normal heat losses in high temperature operation.

In describing our invention, we have, for reasons of simplicity, omitted certain auxiliary equipment, such as pumps, compressors, blowers, waste heat boilers and supplementary equipment for storing and purifying feed material and product of the process. Reactors, absorbers and heat exchange equipment, direct and indirect, may be used in multiple to better integrate the several stages of the process and to conserve the large amount of heat necessary for this type of hydrocarbon conversion.

Having thus described the nature of our invention and the means of practicing the same, but without intending to limit our invention to such specific means save as expressly set forth in the appended claims. we claim:

1. The continuous process for the conversion of methane to a hydrocarbon synthesis gas consisting essentially of from about 1 to about 2 volumes of hydrogen per volume of carbon monoxide which comprises the steps of (1) continuously contacting countercurrently said methane at a temperature within the range of from 1800° F. to 2400° F. with a liquefied metal under nonflooding conditions in one of a plurality of refractory packed reaction zones whereby hydrogen is formed and carbon is deposited in the refractory packing in said reaction zone, (2) continuously contacting in a separate reaction zone porous refractory packing having therein carbon previously deposited by the process of step 1 with air to form a gaseous mixture comprising carbon monoxide and nitrogen and to remove said carbon from said packing, (3) continuously oxidizing the carbon monoxide in at least a part of the gaseous product mixture of step 2 to carbon dioxide, (4) absorbing the carbon dioxide from step 3 in a carbon dioxide absorbent material and removing unabsorbed nitrogen, (5) desorbing the carbon dioxide absorbed in step 4 to produce a substantially pure carbon dioxide stream, (6) continuously pyrolyzing the carbon dioxide of step 5 in one of said refractory packed reaction zones in the presence of carbon formed in step 1 while in counterflow with liquefied metal under nonflooding conditions to produce carbon monoxide, (7) separating the hydrogen in the gaseous effluent stream of step 1 and the carbon monoxide in the gaseous effluent stream of step 6 from metal vapors in said gaseous effluent streams, and (8) recovering said hydrocarbon synthesis gas as a blend of at least a part of the purified hydrogen and carbon monoxide obtained in step 7 of the process.

2. The process as described in claim 1 wherein step 1 and step 6 are carried out simultaneously in the same reaction zone.

3. The process as described in claim 1 wherein step 1 and step 6 are carried out simultaneously in separate reaction zones.

4. A process for the manufacture of hydrogen and carbon monoxide from methane and a free oxygen containing gas in a plurality of porous refractory packed reaction zones which comprises the steps of (1) preheating a liquid metal of group IV of the periodic table selected from the class consisting of tin and lead in a heating zone to a temperature within the range of from 1800° F. to 2400° F., (2) introducing the preheated metal at a point near the top of one of said refractory packed reaction zones and flowing said metal downward under nonflooding conditions over the packing in said reaction zone countercurrent to a stream of methane whereby hydrogen is formed and carbon is deposited in said refractory packing and the temperature of said liquid metal is reduced, (3) contacting in a separate reaction zone refractory packing having therein carbon previously deposited by the process of step 2 with air to form a gaseous mixture comprising carbon monoxide and nitrogen and to remove said carbon from said packing, (4) oxidizing the carbon monoxide in at least a part of the gaseous product mixture of step 3 by burning to carbon dioxide to supply at least a part of the preheat of the metal, (5) absorbing carbon dioxide from the combustion gases resulting from preheating step 1 including carbon dioxide formed in step 4 in an absorption zone containing an alkaline earth metal oxide from the class consisting of magnesium oxide and calcium oxide, (6) subsequently introducing by gravity, the hot liquid metal from step 2 to the absorption zone of step 5 whereby said liquid metal is cooled to a temperature below about 1500° F. and carbon dioxide is desorbed, (7) continuously passing the carbon dioxide desorbed in step 6 to the reaction zone of step 2 in countercurrent flow with the metal in the temperature range as described in step 1 whereby carbon monoxide is formed and carbon is removed from the refractory packing, (8) recycling the cooled metal of step 6 by pumping the same from the carbon dioxide desorption zone of step 6 to preheating step 1, and (9) recovering the hydrogen in the gaseous effluent of step 2 and the carbon monoxide in the gaseous effluent of step 7 from metal vapors in said gaseous effluents by scrubbing said effluents with a relatively cold liquid stream of the same metal as used in steps 2 and 7.

5. The process of claim 4 wherein the metal of step 1 is lead.

6. The process of claim 4 wherein the alkaline earth oxide of step 5 is calcium oxide.

7. The process of claim 4 wherein the alkaline earth oxide absorbent of step 5 comprises a mixture of magnesium oxide and calcium oxide.

8. A process for the manufacture of hydrogen and carbon monoxide from methane and air which comprises the steps of (1) contacting a mixture of methane and carbon dioxide obtained in the manner hereinafter described countercurrently with a hot liquefied metal of group IV of the periodic table selected from the class consisting of tin and lead under nonflooding conditions in a reaction zone packed with a porous refractory solid at temperatures sufficiently high to react said methane and carbon dioxide to form hydrogen and carbon monoxide and deposit carbon in said refractory solid, (2) separating the hydrogen and carbon monoxide in the gaseous effluent of the reaction zone of step 1 from metal vapors in said gaseous effluent by scrubbing in a separate zone said effluent with said liquefied metal, (3) circulating the hot liquid metal from step 1 to a zone containing calcium carbonate to cool said metal to condition the same for pumping to the metal preheating zone and to decompose the calcium carbonate in said zone to calcium oxide and carbon dioxide, (4) continuously passing the carbon dioxide of step 3 to the reaction zone of step 1, (5) diverting the flow of hot liquid metal, methane and carbon dioxide to produce counterflow of the metal with these gases in a second reaction zone to continue the process as described in step 1, (6) regenerating and heating the refractory in the reaction zone of step 1 by oxidizing the deposited carbon to carbon monoxide, (7) burning the carbon monoxide of step 6 with air to carbon dioxide to supply at least a part of the heat necessary for reheating the metal for step 1 in a metal heating zone, and (8) absorbing carbon dioxide formed in step 7 in the calcium oxide produced in step 3 to separate nitrogen and reform calcium carbonate.

9. A multistage process for the manufacture of hydrogen and carbon monoxide from methane and free oxygen containing gas which comprises the steps of (1) contacting methane countercurrently with a liquefied metal under nonflooding conditions in a reaction zone packed with a refractory solid at temperatures sufficiently high to decompose said methane to hydrogen and deposit carbon in said refractory solid, (2) contacting said carbon deposited in step 1 with carbon dioxide obtained in the manner hereinafter defined in counterflow with a stream of said liquefied metal in a second stage at a temperature sufficiently high to cause a part of said carbon to react with said carbon dioxide to form carbon monoxide, (3) separating the hydrogen in the gaseous effluent of the reaction zone of step 1 and separating the carbon monoxide in the gaseous effluent of the reaction zone of step 2 from metal vapors in said effluent streams by scrubbing said stream with relatively cold liquid streams of the same metal used in steps 1 and 2, (4) removing in a third stage at least a major part of the carbon remaining associated with the refractory solid following step 2 by oxidation to produce a gas stream containing carbon monoxide, (5) burning at least a part of the carbon monoxide from step 4 in the presence of a free oxygen containing gas to form carbon dioxide and to preheat the liquefied metal passing to steps 1 and 2, (6) absorbing carbon dioxide from the gaseous combustion products of step 5 in an alkaline earth oxide selected from the class consisting of magnesium oxide and calcium oxide to form the corresponding alkaline earth carbonate, and (7) passing the hot metal effluent from steps 1 and 2 through the alkaline earth carbonate formed in step 6 to cool said metal and to desorb carbon dioxide for recycle to step 2 of the process.

10. A process for the manufacture of hydrogen and carbon monoxide from methane and carbon dioxide comprising the steps of (1) pyrolizing methane in countercurrent flow with a molten metal in a reaction zone packed with a porous refractory solid to produce a hydrogen overhead effluent and deposit carbon in said refractory solid, (2) passing the molten metal effluent from the reaction zone of step 1 through a calcium carbonate packed tower to cool said molten metal and simultaneously decompose said carbonate to calcium oxide and carbon dioxide, (3) passing the carbon dioxide from step 2 to a second porous refractory solid packed reaction zone which has been previously subjected to the methane pyrolyzing reaction of step 1 for the deposition of carbon and contacting said carbon dioxide with the carbon deposited on the refractory solid in said second reaction zone while in counterflow with a molten metal to form carbon monoxide from at least a part of said carbon deposit, and (4) recovering the hydrogen from the overhead effluent from the reaction zone of step 1 and the carbon monoxide from the overhead effluent from step 3.

11. A unitary process for the manufacture of a hydrocarbon synthesis gas consisting essentially of a mixture of about two volumes of hydrogen and about one volume of carbon monoxide comprising the steps of (1) countercurrently contacting with a liquefied metal under nonflooding conditions in a reaction zone packed with a porous refractory solid a mixture of carbon dioxide obtained in the manner hereinafter described and methane of such proportions and at a temperature such that the methane and carbon dioxide react to form a gaseous mixture comprising hydrogen and carbon monoxide in approximately the ratio of 2 volumes of hydrogen to 1 volume of carbon monoxide and deposit carbon in said refractory solid, (2) recovering said mixture of hydrogen and carbon monoxide from any associated vaporized metal, and (3) regenerating said refractory solid packed reaction zone by burning the deposited carbon therefrom in a stream of air to produce carbon dioxide for recycle to step 1.

12. A unitary process for the manufacture of a hydrocarbon synthesis gas comprising about 2 volumes of hydrogen per volume of carbon monoxide from methane and carbon dioxide which comprises contacting methane countercurrently with a liquefied metal under nonflooding conditions in a reaction zone packed with a porous refractory solid at temperatures sufficiently high to decompose said methane to hydrogen and deposit carbon in said refractory solid, and then in a separate reaction stage contacting said carbon in said refractory solid with countercurrent streams of a liquefied metal and carbon dioxide at a sufficiently high temperature to form carbon monoxide, and blending at least a part of said hydrogen and at least a part of said carbon monoxide to obtain said synthesis gas.

13. In a process for the production of hydrogen and carbon monoxide from a methane containing gas and carbon dioxide wherein said methane is converted to hydrogen and carbon and said carbon is converted to carbon monoxide by interaction with carbon dioxide and wherein the endothermic heat requirement for the conversion of the methane to hydrogen and carbon and said carbon and carbon dioxide to carbon monoxide is furnished by circulating a molten mass of metal at temperatures above 1800° F. in direct countercurrent contact with said methane, carbon and carbon dioxide in at least one refractory packed reaction zone, the improvement which comprises cooling the molten metal following contact in said at least one refractory packed reaction zone by passing the molten metal downward from said reaction zone and through a vessel containing at least one alkaline earth carbonate selected from the class consisting of calcium carbonate and magnesium carbonate to decompose said carbonate to the corresponding alkaline earth oxide and to carbon dioxide for use in the carbon monoxide producing refractory packed reaction zone.

14. The improvement of claim 13 wherein the molten metal is lead.

15. The improvement of claim 13 wherein the alkaline earth carbonate is calcium carbonate.

ARMAND J. ABRAMS.
MANUEL H. GORIN.
CHARLES OVID BAKER.

REFERENCES CITED

The following references are of record in the file of this patent:

UNITED STATES PATENTS

| Number | Name | Date |
|---|---|---|
| 1,992,909 | Davis | Feb. 26, 1935 |
| 2,354,353 | Abrams | July 25, 1944 |

FOREIGN PATENTS

| Number | Country | Date |
|---|---|---|
| 523,221 | Great Britain | July 9, 1940 |

Certificate of Correction

Patent No. 2,449,359. September 14, 1948.

ARMAND J. ABRAMS ET AL.

It is hereby certified that errors appear in the printed specification of the above numbered patent requiring correction as follows:

Column 1, line 3, strike out "a" before "synthesis"; line 41, for "of" second occurrence read *at*; column 7, line 29, for "line" read *lime*;

and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*